US012801525B2

(12) United States Patent
Tian

(10) Patent No.: US 12,801,525 B2
(45) Date of Patent: Nov. 17, 2026

(54) METHOD AND SYSTEM FOR STORING METADATA

(71) Applicant: MONTAGE ELECTRONICS (SHANGHAI) CO., LTD., Shanghai (CN)

(72) Inventor: Zhixin Tian, Shanghai (CN)

(73) Assignee: MONTAGE ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/039,860

(22) Filed: Jan. 29, 2025

(65) Prior Publication Data

US 2025/0245152 A1 Jul. 31, 2025

(30) Foreign Application Priority Data

Jan. 30, 2024 (CN) ......................... 202410134309.3

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC ................................... G06F 3/06; G06F 12/08
See application file for complete search history.

(56) References Cited

U.S. PATENT DOCUMENTS 10,114,749 B2 10/2018 Tu et al.
2013/0145076 A1* 6/2013 Chiueh ............... G06F 12/0246 711/E12.008
2013/0185268 A1* 7/2013 Kim .................... G06F 16/2455 707/693
2014/0297961 A1* 10/2014 Thottethodi ........ G06F 12/0875 711/132
2022/0043748 A1* 2/2022 Chaffin ............... G06F 12/0868
2023/0136114 A1* 5/2023 Moyer ................ G06F 12/0815 711/118
2024/0184697 A1* 6/2024 Terpstra .............. G06F 12/0811
2024/0311049 A1* 9/2024 Kachare ................ G06F 3/0659

OTHER PUBLICATIONS

Jim Handy, "The Cache Memory Book", Academic Press, Inc, 1998 (Year: 1998).*

* cited by examiner

*Primary Examiner* — Khoa D Doan
(74) *Attorney, Agent, or Firm* — Oliff PLC

(57) ABSTRACT

A method and system for storing metadata includes: a main memory having a data storage region and a metadata storage region, wherein the data storage region is configured to store related data and its corresponding first error correction code, and the metadata storage region is configured to store metadata and its corresponding second error correction code; a cache memory comprising a cache control state machine and at least one storage unit, wherein the storage unit is configured to cache metadata and its corresponding second error correction codes from the main memory, and the cache control state machine is configured to receive an access request corresponding to the metadata and perform corresponding operation on target metadata cached in the storage unit according to the access request. The application realizes independent access to metadata and to related data without any read and write overhead.

14 Claims, 3 Drawing Sheets

METHOD AND SYSTEM FOR STORING METADATA

CROSS-REFERENCE TO PRIOR APPLICATION

This application claims priority to Chinese Application No. 202410134309.3 filed on Jan. 30, 2024, which is incorporated herein by reference in its entirety.

TECHNICAL FIELD

This application relates to the field of computer technology, particularly to a method and system for storing metadata.

BACKGROUND

CXL (Compute Express Link) technology is a new high-speed interconnect technology developed based on PCIe (Peripheral Component Interconnect Express). It is a dynamic multi-protocol technology aimed at providing higher data throughput and lower latency to meet requirements of modern computing and storage systems. For some CXL devices (such as Type 3 devices), the CXL specification defines metadata to record the ownership of each cache line. At present, in-band storage is commonly used to store metadata, that is, the metadata is stored in a main memory (such as DRAM). For example, error correction codes (ECC) and the metadata are concatenated for in-band storage. Alternatively, a "modulation operation" is performed on the originally calculated ECC based on the metadata values, and then the modulated ECC is sent to DRAM. Through the additional "modulation operation" step, metadata information has been "embedded" into the modulated ECC. However, both schemes result in excessive write-after-read traffic and fail to utilize the inherent spatial locality of access patterns, thereby increasing the overhead of CXL metadata.

This section aims to provide background or context for the implementation of the application stated in the claims. The description here should not be considered as prior art merely because it is included in this section.

SUMMARY OF THE INVENTION

An object of this application is to provide a method and system for storing metadata that decouple access to related data and the metadata, store the metadata independently of the related data, and realize independent access to the metadata and to the related data, thereby eliminating the requirement for any DRAM overhead of write-after-read.

The application discloses a system for storing metadata, comprising:

- a main memory comprising a data storage region and a metadata storage region, wherein the data storage region is configured to store related data and its corresponding first error correction code, and the metadata storage region is configured to store metadata and its corresponding second error correction code; and
- a cache memory comprising a cache control state machine and at least one storage unit, wherein the storage unit is configured to cache metadata and its corresponding second error correction codes from the main memory, and the cache control state machine is configured to receive an access request corresponding to the metadata and perform corresponding operation on target metadata cached in the storage unit according to the access request.

According to one embodiment, the cache control state machine performing corresponding operation on the target metadata cached in the storage unit according to the access request, comprises:

- determining whether the target metadata corresponding to the access request is cached in the storage unit, and when it is determined that the target metadata is cached in the storage unit, performing corresponding operation on the target metadata; when it is determined that the target metadata is not cached in the storage unit, retrieving a target cache line where the target metadata is located from the main memory and caching the target cache line into the storage unit.

According to one embodiment, the cache control state machine caching the target cache line into the storage unit comprises:

- selecting a cache line from a plurality of cache lines in the storage unit as a victim cache line, and overwriting the victim cache line with the obtained target cache line.

According to one embodiment, before overwriting the victim cache line with the obtained target cache line, the cache control state machine is further configured to:

- determining whether the victim cache line has been modified based on a state field of the victim cache line, and when it is determined that the victim cache line has not been modified, overwriting the victim cache line with the obtained target cache line; when it is determined that the victim cache line has been modified, storing the victim cache line into the main memory and overwriting the victim cache line in the storage unit with the obtained target cache line.

According to one embodiment, when the access request is a read request, after the cache control state machine caches the target cache line into the storage unit, the cache control state machine is further configured to mark a state field of the target cache line as Exclusive to indicate that the target cache line has not been modified.

According to one embodiment, when the access request is a write request, after the cache control state machine performs corresponding operation on the target metadata cached in the storage unit according to the access request, the cache control state machine is further configured to mark a state field of the target cache line where the target metadata is located as Modified to indicate that the target cache line has been modified.

According to one embodiment, the cache memory further comprises a tag array memory configured to store a tag field, a state field, and a count field corresponding to each cache line in the storage unit;

- wherein, the tag field is configured to indicate a storage address of the cache line in the main memory, the count field is configured to indicate a historical access times of the cache line, and the state field is configured to indicate state of the cache line.

According to one embodiment, determining whether the target metadata corresponding to the access request is cached in the storage unit comprises:

- comparing, by the cache control state machine, the tag field at a target address corresponding to the access request with the tag field of the cache line in the at least one storage unit pointed to by an index field in the target address corresponding to the access request;
- when the tag field in the target address matches the tag field of any cache line in the at least one storage unit, determining that the target metadata corresponding to the access request is cached in the storage unit; and when the tag field in the target address does not match the tag fields of all cache lines in at least one storage unit, determining that the target metadata corresponding to the access request is not cached in the storage unit.

The application discloses a method for storing metadata applied to a system for storing metadata, the system comprising a main memory and a cache memory, the main memory comprising a data storage region and a metadata storage region, wherein the data storage region is configured to store related data and its corresponding first error correction code, and the metadata storage region is configured to store metadata and its corresponding second error correction code; the cache memory comprises a cache control state machine and at least one storage unit, wherein the storage unit is configured to cache metadata and its corresponding second error correction codes from the main memory; the method comprises:

receiving, by the cache control state machine, an access request corresponding to the metadata and performing corresponding operation on target metadata cached in the storage unit according to the access request.

According to one embodiment, the cache control state machine performing corresponding operation on the target metadata cached in the storage unit according to the access request, comprises:

determining whether the target metadata corresponding to the access request is cached in the storage unit;

when it is determined that the target metadata is cached in the storage unit, the cache control state machine performs corresponding operation on the target metadata; and when it is determined that the target metadata is not cached in the storage unit, retrieving a target cache line where the target metadata is located from the main memory and caching the target cache line into the storage unit.

According to one embodiment, the cache control state machine caching the target cache line into the storage unit comprises:

selecting a cache line from a plurality of cache lines in the storage unit as a victim cache line, and overwriting the victim cache line with the obtained target cache line.

According to one embodiment, before overwriting the victim cache line with the obtained target cache line, the method further comprises:

determine whether the victim cache line has been modified according to the state field of the victim cache line;

when it is determined that the victim cache line has not been modified, overwriting the victim cache line with the obtained target cache line; and when it is determined that the victim cache line has been modified, storing the victim cache line into the main memory and overwriting the victim cache line in the storage unit with the obtained target cache line.

According to one embodiment, when the access request is a read request, after the cache control state machine caches the target cache line in the storage unit, the method further comprises:

marking a state field of the target cache line as Exclusive to indicate that the target cache line has not been modified.

According to one embodiment, when the access request is a write request, after the cache control state machine performs corresponding operation on the target metadata cached in the storage unit according to the access request, the method further comprises:

marking a state field of the target cache line where the target metadata is located as Modified to indicate that the target cache line has been modified.

In the implementation of this application, an out-of-band storage scheme is adopted to decouple access to the related data and the metadata, store the metadata independently of the related data, and realize independent access to the metadata and to the related data, thereby eliminating the requirement for any DRAM overhead of write-after-read and fully utilizing the inherent spatial locality of the metadata. Furthermore, this scheme sets up a cache on the chip for caching the metadata, which can make the access to metadata have a certain continuity and avoid frequent access to the main memory (such as DRAM).

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

Explanation of Some Concepts:

Cache is a high-speed, small capacity storage device located between a processor and a main memory, typically composed of SRAM (Static Random Access Memory), and the cache is a bridge between the CPU and the main memory, configured to balance speed difference between a high-speed device (the CPU) and a low-speed device (the main memory).

Cache line is a unit of the cache configured to store instruction data.

Metadata, also known as intermediary data or relay data, is used for describing data which is also referred to as "related data" in the application. It mainly describes information about data properties and is configured to support functions such as indicating storage locations, historical data, resource searches, file records, etc. Metadata can be considered as an electronic catalog. In order to achieve the purpose of compiling a catalog, it is necessary to describe and collect the content or properties of the data, thereby assisting in data retrieval.

Error Correction Code (ECC) is a technology that realizes "error checking and correction".

In order to make the objects, technical solutions and advantages of the present application more clear, embodiments of the present application will be further described in detail below with reference to the accompanying drawings.

Figure 1:
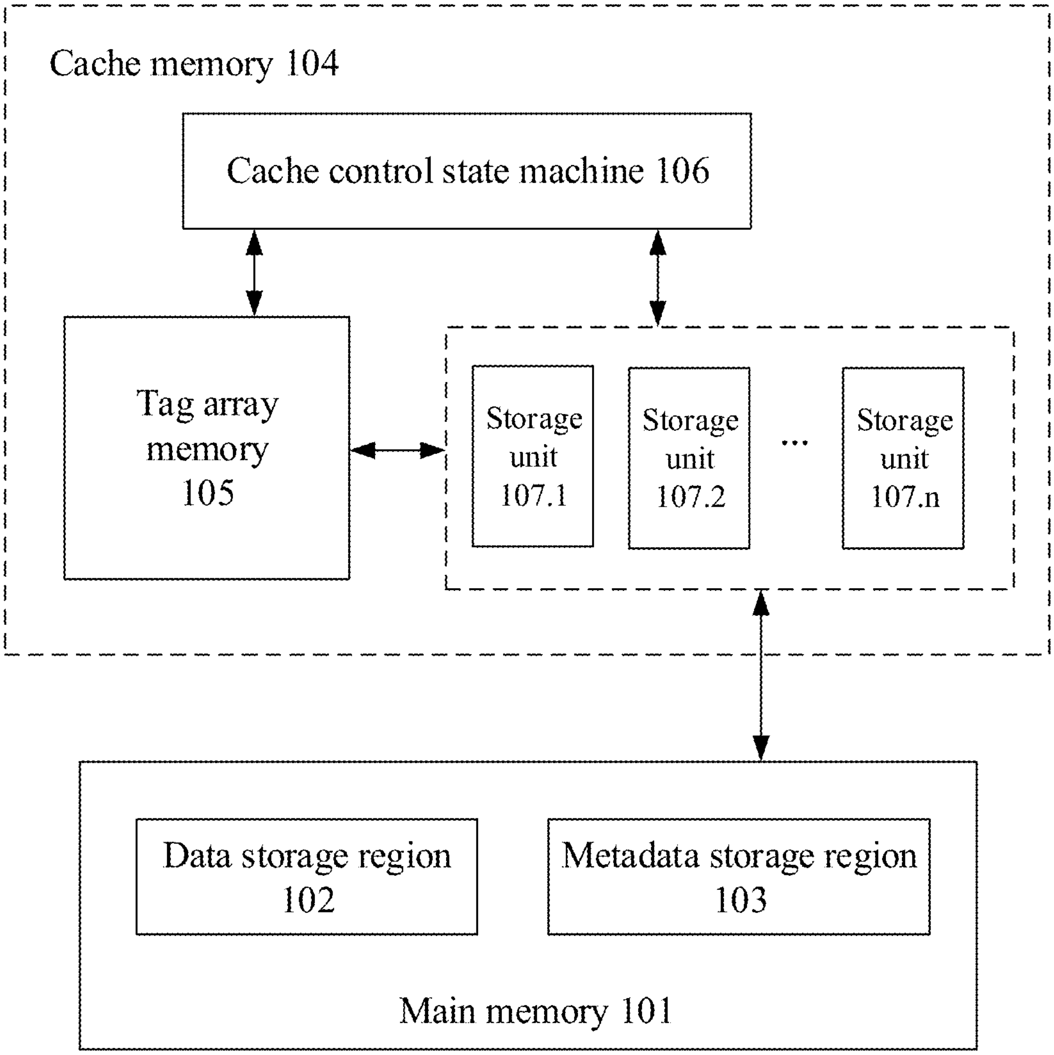
FIG. 1 is a block diagram of a system for storing metadata according to an embodiment of the present application.

The metadata defined by CXL has an asymmetric access pattern with its related data, so when using in-band storage for CXL defined metadata, most of read commands may result in write-after-read operations on DRAM. Based on this, this application adopts an out-of-band storage scheme to decouple access to the related data and the metadata, as shown in FIG. 1, this application stores the metadata independently from the related data, both the metadata and the related data can be protected by corresponding ECC, and this storage scheme realizes independent access to the metadata and to the related data, thereby eliminating the requirement for any DRAM overhead of write-after-read and fully utilizing the inherent spatial locality of access pattern. Furthermore, this scheme sets up a cache on the chip for caching the metadata, which can make the access to metadata have a certain continuity and avoid frequent access to the main memory (such as DRAM).

The present application will be specifically described below in connection with specific embodiments.

The present embodiment discloses a system for storing metadata, as shown in FIG. 1, which comprises a main memory 101 and an on-chip cache memory 104. The main memory 101 comprises a data storage region 102 and a metadata storage region 103, where the data storage region 102 is configured to store related data and its corresponding first error correction code, and the metadata storage region 103 is configured to store metadata and its corresponding second error correction code. In one embodiment, the main memory 101 may be dynamic random access memory (DRAM). The cache memory 104 may comprise a cache control state machine 106, a tag array memory 105, and at least one storage unit for caching the metadata, such as storage unit 107.1, storage unit 107.2, . . . , and storage unit 107.*n* shown in FIG. 1. Each storage unit can be implemented by static random access memory (SRAM), and in some embodiments, the storage unit can be implemented by SRAM inside the chip. Typically, the processor chip may pre-read some metadata and their corresponding second error correction codes from the metadata storage region 103 in the main memory 101 and cache them in the cache memory 104. Subsequently, the metadata and the second error correction codes can be directly retrieved from the cache memory 104.

Each storage unit can store a plurality of cache lines, and the minimum access granularity for data access between the main memory 101 and the cache memory 104 is a cache line. Each cache line comprises a tag field, a state field, a count field, a data field, etc. The tag array memory 105 is configured to store tag fields, state fields, and count fields corresponding to all cache lines in the storage units, where each line of the tag array memory 105 corresponds to a cache line. The tag field indicates the storage address of the metadata in the main memory 101 cached in the cache line. The tag field is a part of the storage address (the tag part of the storage address) of the metadata in the main memory 101 cached in the cache line. The count field is configured to store the historical access count of the cache line. The state field is used to indicate the state of the cache line, such as exclusive state, or a modified state. The exclusive state indicates that the metadata cached in the cache line is the same as the metadata stored at the corresponding address in the main memory 101, that is, the metadata cached in the cache line has not been modified, and for example, it can be represented by "Exclusive". The modified state indicates that the metadata cached in the cache line is different from the metadata stored at the corresponding address in the main memory 101, that is, the metadata cached in the cache line has been modified, and for example, it can be represented by "Modified".

The cache control state machine 106 receives an access request from a host, and a target address corresponding to the access request may include a tag field, an index field, and an offset field. The index field is configured to indicate a cache line corresponding to the access request. It can be understood that when the cache memory 104 comprises a plurality of storage units, the index field can simultaneously serve as indexes for the cache lines in the plurality of storage units. The tag field is configured to indicate an address in the main memory 101 corresponding to the access request. The offset field is configured to indicate an offset position of the target metadata corresponding to the access request in the target address. The access request may include a read request for the metadata and a write request for the metadata.

Specifically, when the cache control state machine 106 receives the access request, it can determine whether the metadata in the target address (i.e. target metadata) corresponding to the access request is cached in the cache memory according to the access request.

In one embodiment, the cache control state machine 106 may first determine the cache line in the cache memory corresponding to the target address according to the index field in the target address. When the cache memory comprises a plurality of storage units, the index field can index cache lines in the plurality of storage units. Then, the cache control state machine can compare the tag field in the target address with the tag field of the cache line in each storage unit pointed to by the index field. When the tag field in the target address matches the tag field of a cache line in one of the storage units, it indicates that the metadata in the target address is cached in the cache memory, and the matching cache line is the target cache line where the metadata in the target address is stored. When the tag field in the access request does not match the tag field of the cache line in each storage unit, it indicates that the metadata in the target address is not cached in the cache memory.

When it is determined that the metadata in the target address is cached in the cache memory 104, the cache control state machine 106 can directly perform the access request on the target cache line. Corresponding to a read request, the cache control state machine 106 can determine the position of the target metadata to be read in the target cache line based on the offset field in the access request, and read the target metadata from the determined position and return it to the host. Corresponding to a write request, the cache control state machine 106 may determine the write position of the target metadata to be written in the target cache line based on the offset field in the access request, and write the target metadata to the determined write position.

When it is determined that the metadata in the target address is not cached in the cache memory 104, the cache control state machine 106 may select a cache line from the cache lines of the plurality of storage units of the cache memory 104 as a victim cache line, and determine whether the victim cache line needs to be stored in the main memory 101 based on the state field of the victim cache line. When the state field of the victim cache line indicates that the victim cache line has been modified, the cache control state machine 106 stores the victim cache line in the main memory 101. When the state field of the victim cache line indicates that the victim cache line has not been modified, there is no need to store the victim cache line in the main memory, and subsequent replacement operations can be performed directly.

In one embodiment, the cache control state machine 106 selects a cache line as a victim cache line according to preset rules. For example, the cache control state machine 106 may select a cache line based on the count field of the cache line, such as selecting the cache line with the smallest count value as the victim cache line. It should be noted that the application is not limited to this, and any suitable rule or random selection can be used to replace the cache line.

After determining the victim cache line, the cache control state machine 106 may retrieve the target cache line corresponding to the access request from the main memory 101 and overwrite the victim cache line in the cache memory with the target cache line. Then, the cache control state machine 106 may perform corresponding operations on the target cache line in the cache memory 104 according to the access request.

Figure 2:
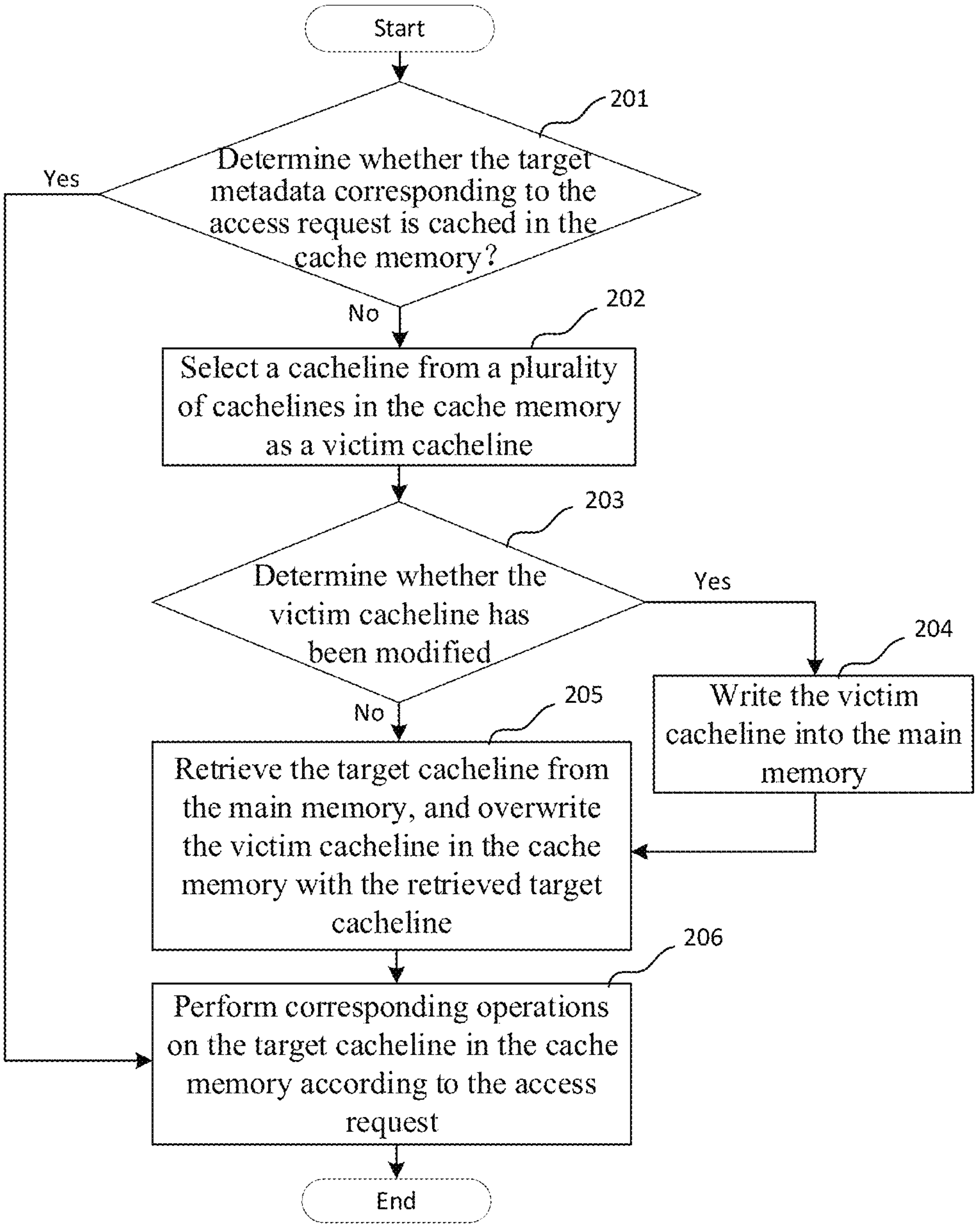
FIG. 2 is a flowchart of a method for storing metadata according to an embodiment of the present application.

The present embodiment also provides a method for storing metadata, the flowchart of which is shown in FIG. 2. The method may be applied to the cache control state machine 106 described above. The method comprises the following steps.

Step 201: in response to receiving an access request, determining whether the metadata in the target address corresponding to the access request is cached in the cache memory. If not, proceeding to step 202; if so, proceed directly to step 206.

The cache control state machine 106 may determine whether the metadata in the target address is cached in the cache memory based on the index field and the tag field in the target address. Specifically, the cache control state machine 106 may first determine the cache line of the cache memory corresponding to the target address based on the index field, and then compare the tag field in the target address with the tag field of the determined cache line. If the tag field in the target address matches the tag field of the determined cache line, it indicates that the metadata in the target address is cached in the cache memory, and the matching cache line is the target cache line where the metadata in the target address is stored. If the tag field in the target address does not match the tag field of the determined cache line, it indicates that the metadata in the target address is not cached in the cache memory. When the cache memory comprises a plurality of storage units, the index field may point to cache lines in the plurality of storage units. At this point, the cache control state machine may compare the tag field in the target address with the tag fields of all cache lines pointed to by the index field. If the tag field in the target address matches the tag field of one of the cache lines, it indicates that the metadata in the target address is cached in the cache memory. If the tag field in the target address does not match the tag fields of all cache lines, it indicates that the metadata in the target address is not cached in the cache memory.

Step 202: selecting a cache line from the cache memory as a victim cache line.

As mentioned above, the cache control state machine may randomly select a cache line as the victim cache line, or select based on the count field corresponding to each cache line in the cache memory, such as selecting the cache line with the smallest count value as the victim cache line.

Step 203: determining whether the victim cache line has been modified. If it has been modified, step 204 is performed; if it has not been modified, step 205 is performed.

If the victim cache line has been modified, it indicates that the metadata stored in the victim cache line is different from the metadata stored at the corresponding address in the main memory, so the victim cache line needs to be written to the main memory. If the victim cache line has not been modified, it indicates that the metadata stored in the victim cache line is the same as the metadata stored at the corresponding address in the main memory, deleting the metadata stored in the victim cache line will not cause metadata loss.

The cache control state machine may determine whether the victim cache line has been modified based on the state field corresponding to the victim cache line. For example, if the state field corresponding to a victim cache line represents an exclusive state, it indicates that the victim cache line has not been modified. When the state field corresponding to a victim cache line represents a modified state, it indicates that the victim cache line has been modified.

Step 204: writing the victim cache line into the main memory.

Step 205: retrieving the target cache line corresponding to the target address from the main memory, and overwriting the victim cache line in the cache memory with the target cache line.

It can be understood that when the access request is a read request for the metadata, after overwriting the victim cache line in the cache memory with the target cache line, the cache control state machine may mark the state of the target cache line as unmodified, e.g., by marking it "Exclusive".

Step 206: performing corresponding operations on the target cache line in the cache memory according to the access request.

It can be understood that in Step 201, when the tag field in the target address matches the tag field of the cache line pointed to by the index field, the matching cache line is the target cache line; When the tag field in the target address does not match the tag field of the cache line pointed to by the index field, the cache line corresponding to the target address obtained from the main memory in Step 205 is the target cache line.

If the access request is a read request for the metadata, the corresponding target metadata may be read from the target cache line and returned to the host. The cache control state machine may determine the position of the target metadata to be read in the target cache line based on the offset field in the target address.

If the access request is a write request for metadata, the target metadata to be written may be written to the target cache line. The cache control state machine may determine the write location based on the offset field in the target address. It can be understood that after writing the target metadata into the target cache line, the cache control state machine may mark the state of the target cache line as modified, e.g., by marking it "Modified".

Figure 3:
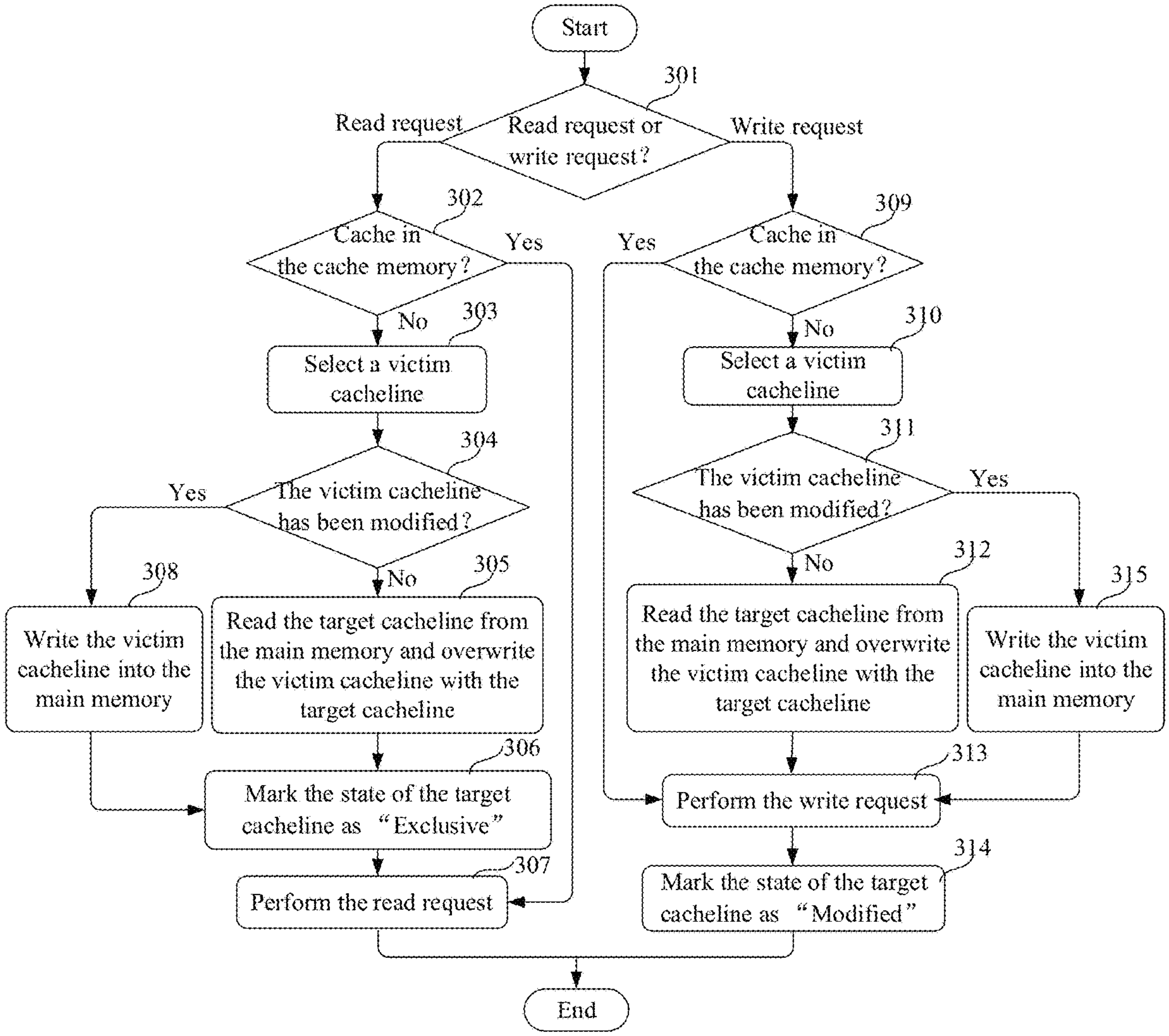
FIG. 3 is a detailed flowchart of operations for storing metadata according to an embodiment of the present application.

In practical applications, the cache control state machine may also first determine the type of access request (read request or write request) when receiving an access request, and then perform different steps according to the type of access request, as shown in FIG. 3.

Step 301: in response to receiving an access request, determining whether the access request is a read request for the metadata or a write request for the metadata. If it is a read request, the cache control state machine performs steps 302-308, and if it is a write request, the cache control state machine performs steps 309-315.

In one embodiment, if the access request is a read request for the metadata, the cache control state machine performs the following operations:

Step 302: determining whether the metadata in the target address corresponding to the read request is cached in the cache memory.

If the metadata in the target address corresponding to the read request is not cached in the cache memory (i.e. cache miss), proceeding to Step 303, selecting a cache line from the cache lines in the cache memory as a victim cache line, and then proceeding to Step 304. If the metadata in the target address corresponding to the read request is cached in the cache memory (i.e. cache hit), proceeding to Step 307.

Step 304: determining whether the victim cache line has been modified based on its state.

If the victim cache line has not been modified, proceeding to Step 305, reading the target cache line corresponding to the target address from the main memory, overwriting the victim cache line with the target cache line, and then proceeding to Step 306. If the victim cache line has been modified, Step 308 is performed to write the victim cache line into the main memory.

Step 306: marking the target cache line as an exclusive state.

Step 307: returning the target metadata.

Step 308: writing the victim cache line into the main memory.

In one embodiment, if the access request is a write request for the metadata, the cache control state machine performs the following operations:

Step 309: determining whether the metadata in the target address corresponding to the write request is cached in the cache memory.

If the metadata in the target address corresponding to the write request is not cached in the cache memory (i.e. cache miss), Step 310 and Step 311 are performed. If the metadata in the target address corresponding to the write request is cached in the cache memory (i.e. cache hit), Step 313 is performed.

Step 310: selecting a cache line from the cache lines in the cache memory as a victim cache line.

Step 311: determining whether the victim cache line has been modified based on its state.

If the victim cache line has not been modified, Step 312 and Step 313 are performed. If the victim cache line has been modified, Step 315 is performed to write the victim cache line into the main memory.

Step 312: reading the target cache line corresponding to the target address is read from the main memory and overwriting the victim cache line with the target cache line.

Step 313: writing the corresponding metadata into the target cache line.

Step 314: marking the target cache line as a modified state.

Step 315: writing the victim cache line into the main memory.

The present embodiment stores the metadata and the related data separately, and both the metadata and the related data are protected by ECC. Due to the decoupling of the metadata and the related data, it will avoid dynamic updating of the metadata and read-modify-write (RMW) bursted of complete DRAM. The metadata is cached by adopting dedicated cache to utilize the inherent spatial locality of access patterns. According to the metadata access attributes defined in the CXL specification, read allocation and write allocation set-associativity are used to write back to the cache to minimize DRAM overhead. And the metadata cache is located upstream of the DRAM controller, and its implementation is not affected by version updates of IP modules of CXL controller and DRAM controller.

Correspondingly, the embodiments of the present invention also provide a computer-readable storage medium in which computer-executable instructions are stored. When the computer-executable instructions are executed by a processor, the method embodiments of the present invention are implemented. The computer-readable storage media comprises permanent and non-permanent, removable and non-removable media can be used by any method or technology to implement information storage. Information can be computer-readable instructions, data structures, program modules, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only optical disc read-only memory (CD-ROM), digital multifunctional optical disc (DVD) or other optical storage, magnetic cartridge tapes, magnetic tape disk storage or other magnetic storage devices, or any other non-transport media that can be used to store information that can be accessed by computing devices. As defined herein, a computer-readable storage medium does not include transient computer-readable media (transitory media), such as modulated data signals and carriers.

It should be noted that in this specification of the application, relational terms such as the first and second, and so on are only configured to distinguish one entity or operation from another entity or operation, and do not necessarily require or imply any such actual relationship or order between these entities or operations. Furthermore, the term “comprises” or “comprising” or “includes” or any other variations thereof is intended to encompass a non-exclusive inclusion, such that a process, method, article, or device that comprises multiple elements include not only those elements but also other elements, or elements that are inherent to such a process, method, item, or device. Without more restrictions, the element defined by the phrase “comprise(s) a/an” does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A system for storing metadata, comprising:

a main memory comprising a data storage region and a metadata storage region, wherein the data storage region is configured to store related data and its corresponding first error correction code, and the metadata storage region is configured to store the metadata and its corresponding second error correction code, the metadata describes information about data properties of the related data, wherein the related data and the metadata are stored independently and each possesses its independent error correction code; and a cache memory comprising a cache control state machine and at least one storage unit, wherein the storage unit is configured to cache the metadata and its corresponding second error correction codes from the main memory and not cache the related data and its corresponding first error correction code, and the cache control state machine is configured to receive an access request corresponding to the metadata and perform corresponding operation on target metadata cached in the storage unit according to the access request, wherein access to the metadata by the cache control state machine is independent of access to the related data, thereby enabling operations on the metadata to be performed without requiring a read-after-write operation on the main memory.

2. The system according to claim 1, wherein the cache control state machine performing corresponding operation on the target metadata cached in the storage unit according to the access request, comprises:

determining whether the target metadata corresponding to the access request is cached in the storage unit, and when it is determined that the target metadata is cached in the storage unit, performing corresponding operation on the target metadata; when it is determined that the target metadata is not cached in the storage unit, retrieving a target cache line where the target metadata is located from the main memory and caching the target cache line into the storage unit.

3. The system according to claim 2, wherein the cache control state machine caching the target cache line into the storage unit comprises:

selecting a cache line from a plurality of cache lines in the storage unit as a victim cache line, and overwriting the victim cache line with the obtained target cache line.

4. The system according to claim 3, wherein before overwriting the victim cache line with the obtained target cache line, the cache control state machine is further configured to:

determining whether the victim cache line has been modified based on a state field of the victim cache line, and when it is determined that the victim cache line has not been modified, overwriting the victim cache line with the obtained target cache line; when it is determined that the victim cache line has been modified, storing the victim cache line into the main memory and overwriting the victim cache line in the storage unit with the obtained target cache line.

5. The system according to claim 2, wherein when the access request is a read request, after the cache control state machine caches the target cache line into the storage unit, the cache control state machine is further configured to mark a state field of the target cache line as Exclusive to indicate that the target cache line has not been modified.

6. The system according to claim 1, wherein when the access request is a write request, after the cache control state machine performs corresponding operation on the target metadata cached in the storage unit according to the access request, the cache control state machine is further configured to mark a state field of the target cache line where the target metadata is located as Modified to indicate that the target cache line has been modified.

7. The system according to claim 4, wherein the cache memory further comprises a tag array memory configured to store a tag field, the state field, and a count field corresponding to each cache line in the storage unit;

wherein the tag field is configured to indicate a storage address of the cache line in the main memory, the count field is configured to indicate a historical access times of the cache line, and the state field is configured to indicate state of the cache line.

8. The system according to claim 7, wherein determining whether the target metadata corresponding to the access request is cached in the storage unit comprises:

comparing, by the cache control state machine, the tag field at a target address corresponding to the access request with the tag field of the cache line in the at least one storage unit pointed to by an index field in the target address corresponding to the access request;

when the tag field in the target address matches the tag field of any cache line in the at least one storage unit, determining that the target metadata corresponding to the access request is cached in the storage unit; and when the tag field in the target address does not match the tag fields of all cache lines in the at least one storage unit, determining that the target metadata corresponding to the access request is not cached in the storage unit.

9. A method for storing metadata applied to a system for storing the metadata, the system comprising a main memory and a cache memory, the main memory comprising a data storage region and a metadata storage region, wherein the data storage region is configured to store related data and its corresponding first error correction code, and the metadata storage region is configured to store the metadata and its corresponding second error correction code, the metadata describes information about data properties of the related data, wherein the related data and the metadata are stored independently and each possesses its independent error correction code; the cache memory comprises a cache control state machine and at least one storage unit, wherein the storage unit is configured to cache the metadata and its corresponding second error correction codes from the main memory; the method comprises:

receiving, by the cache control state machine, an access request corresponding to the metadata and performing corresponding operation on target metadata cached in the storage unit according to the access request, wherein access to the metadata by the cache control state machine is independent of access to the related data, thereby enabling operations on the metadata to be performed without requiring a read-after-write operation on the main memory.

10. Method according to claim 9, wherein the cache control state machine performing corresponding operation on the target metadata cached in the storage unit according to the access request, comprises:

determining whether the target metadata corresponding to the access request is cached in the storage unit;

when it is determined that the target metadata is cached in the storage unit, the cache control state machine performs corresponding operation on the target metadata; and when it is determined that the target metadata is not cached in the storage unit, retrieving a target cache line where the target metadata is located from the main memory and caching the target cache line into the storage unit.

11. Method according to claim 10, wherein the cache control state machine caching the target cache line into the storage unit comprises:

selecting a cache line from a plurality of cache lines in the storage unit as a victim cache line, and overwriting the victim cache line with the obtained target cache line.

12. Method according to claim 11, wherein before overwriting the victim cache line with the obtained target cache line, the method further comprises:

determine whether the victim cache line has been modified according to the state field of the victim cache line;

when it is determined that the victim cache line has not been modified, overwriting the victim cache line with the obtained target cache line; and when it is determined that the victim cache line has been modified, storing the victim cache line into the main memory and overwriting the victim cache line in the storage unit with the obtained target cache line.

13. Method according to claim 10, wherein when the access request is a read request, after the cache control state machine caches the target cache line in the storage unit, the method further comprises:

marking a state field of the target cache line as Exclusive to indicate that the target cache line has not been modified.

14. Method according to claim 9, wherein when the access request is a write request, after the cache control state machine performs corresponding operation on the target metadata cached in the storage unit according to the access request, the method further comprises:

marking a state field of the target cache line where the target metadata is located as Modified to indicate that the target cache line has been modified.

* * * * *